Dec. 18, 1956   H. RUTISHAUSER   2,774,870
DEVICE FOR INDICATING PHYSICAL PHENOMENA
Filed Oct. 23, 1952

United States Patent Office 2,774,870
Patented Dec. 18, 1956

2,774,870
DEVICE FOR INDICATING PHYSICAL PHENOMENA

Hans Rutishauser, Altadena, Calif.

Application October 23, 1952, Serial No. 316,487

2 Claims. (Cl. 250—27)

In the investigation of pressure transients such as seen in detonative combustion engines and jet motors and pressure variations in hydraulic systems, it is necessary to visualize pressure surges of microsecond duration. This has been tried with piezo-crystal or condenser pick-ups, but low natural frequencies, either of the pickups or the electrical systems, held up the aim. Existing devices of the piezo-crystal and capacity type are further extremely sensitive to temperature influences.

The present invention relates to a device for indicating physical phenomena wherein a capacity pickup is influencing a high frequency oscillatory system. An object of the invention is to provide for a device in which the electronic translation is improved in such manner, that a wide band of frequencies can be passed and that foreign external electrostatic and dynamic fields do not influence the operation of the device. This is achieved by the fact that the pickup is arranged to be a modulating member of an oscillatory circuit.

In a previous system the pickup circuit is directly connected to the tank circuit of the oscillator. Matching difficulties between pickup and oscillator were found especially in view of cable lengths in excess of ½λ. Furthermore, a high power oscillator had to be used to maintain oscillation and to compensate for cable losses. Power oscillator tubes were frequently microphonic causing error signals. From manufacturing standpoint uniform production was severely affected.

The new circuit will bridge the above drawbacks in so far as a low power oscillator can be applied, which is coupled to the discriminator. The pickup is linked to the discriminator. The pickup and its matching transformer are connected through a cable to the link coil of the discriminator, therefore a reflected reactance change from the pickup will phase or frequency modulate the discriminator (see Hund "Frequency Modulation" 1942, chap. II, sec. 33, page 183).

The output will be D. C. proportional to the change in reactance of the pickup. For adjusting the carrier frequency the discriminator will serve as frequency measuring device, where an output meter will indicate zero at center frequency.

Since the pickup response, i. e. pressure versus output voltage follows a nonlinear function, a linearity compensating arrangement is introduced.

In the accompanying drawings the pressure indicating device, in accordance with my invention, is illustrated by way of example.

Figure 1:
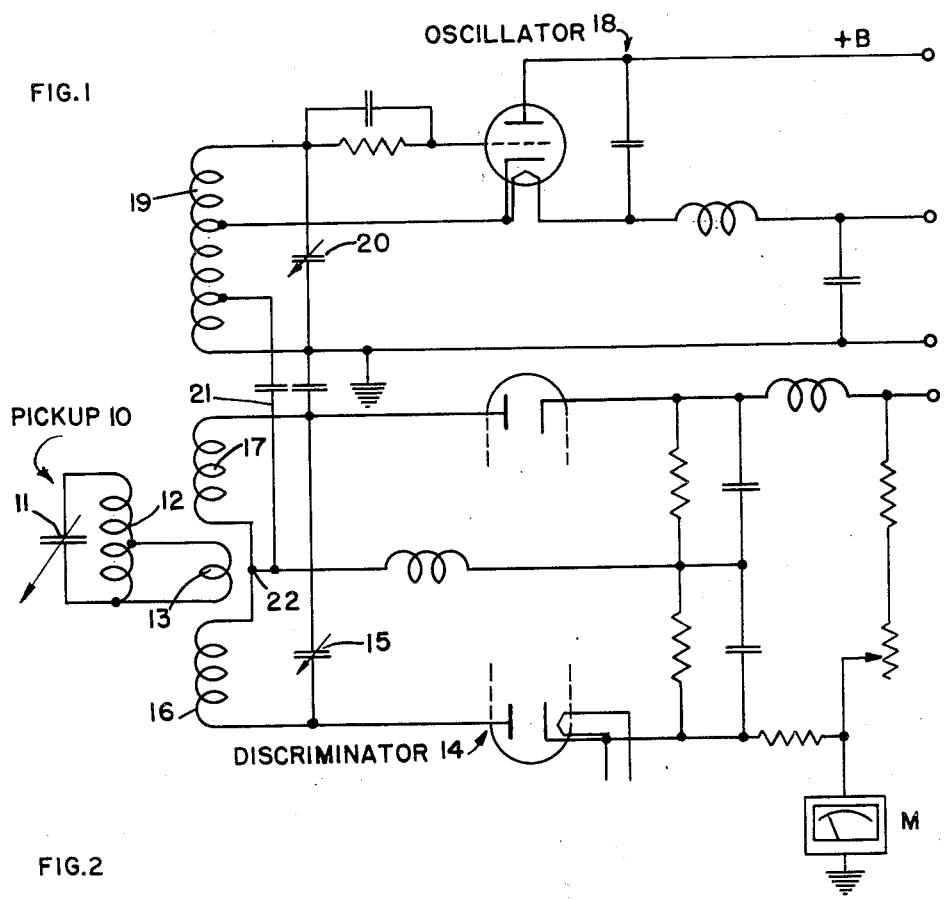
Fig. 1 is a schematic diagram of the circuit arrangement.

Referring to Fig. 1, the pickup 10 has a variable capacitor generally indicated by the numeral 11. Such variable capacitors are often provided by making one plate of a condenser in the form of a flexible diaphragm which is moveable by forces exerted by the phenomenon being measured. A pickup coil 12 is connected across the capacitor 11, and a detector coil 13 is connected across said pickup coil.

A discriminator 14 includes a tuned circuit having a capacitor 15, which is preferably adjustable, and a pair of discriminator coils 16, 17. These coils are connected in series with each other, and across the capacitor 15. Detector coil 13 is linked to the discriminator coils, and is disposed between them. The discriminator operates on a principle described by Foster-Seeley.

The electron tube oscillator 18 has a tank circuit including a tank coil 19 and an adjustable tank capacitor 20. A lead 21 interconnects the oscillator with a point 22 between the two discriminator coils.

Figure 2:
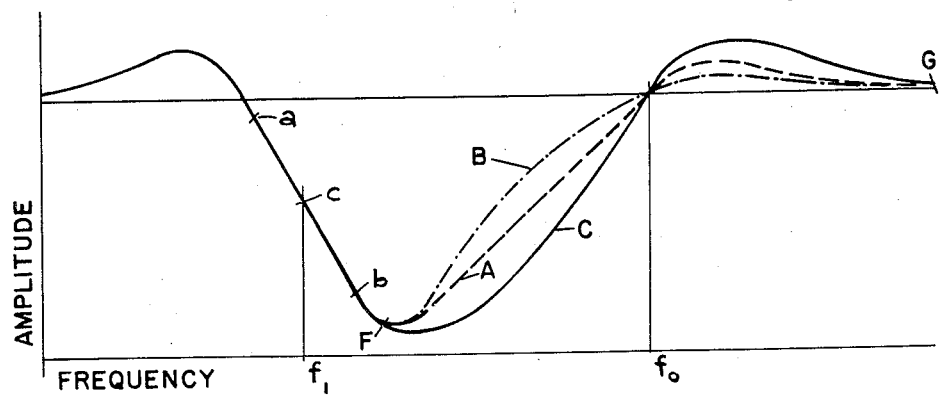
Fig. 2 illustrates a discriminator curve, where output voltage is correlated to frequency.

If the frequency of the discriminator would be $f_1$, the output voltage will be $c$ (Fig. 2). A change of the capacity of 20 would change the output voltage to $a$ or $b$. Since the pickup usually follows a nonlinear function, it is advisable to tune the discriminator somewhat lower so that the oscillator frequency $f_0$ falls on the upper branch of the frequency curve FG of the discriminator characteristic. This branch has the quality of partially changing the curvature, concave straight or convex, depending on the setting of the condenser 20 called the linearity control. By this means various pickups can be adapted for linear output.

In order to reduce capacity microphonics, the oscillator tube filaments and cathode are tied to be of equal R. F. potential and connected to the feed-back loop on coil 19.

I claim:

1. A device for indicating physical phenomena comprising a pickup, said pickup comprising a variable capacitor and a pickup coil connected across said variable capacitor, a detector coil connected across said pickup coil, a discriminator, a tuned circuit in said discriminator comprising a capacitor and a pair of discriminator coils, said coils being serially connected with each other across said adjustable capacitor, said detector coil being disposed between and linked to both of said discriminator coils, an oscillator, a tank circuit in said oscillator comprising a tank coil and an adjustable tank capacitor, a lead interconnecting said tank coil and a point in the tuned circuit between the discriminator coils, whereby the oscillator supplies high frequency energy to the discriminator coils, and changes in reactance of the pick-up modulate the frequency of said high frequency energy.

2. Apparatus according to claim 1, in which the capacitor in the discriminator is adjustable for tuning the discriminator to the frequency of the oscillator.

References Cited in the file of this patent

UNITED STATES PATENTS

| | | |
|---|---|---|
| 2,404,026 | Beard et al. | July 16, 1946 |
| 2,439,047 | Grinstead | Apr. 6, 1948 |
| 2,494,934 | Doucette | Jan. 17, 1950 |

OTHER REFERENCES

Radio Amateur's Handbook, pages 95, 115, 1946 ed.